July 7, 1931.   E. M. SMITH   1,812,904
WHEELED HARROW FRAME ADJUSTMENT
Original Filed Jan. 19, 1928
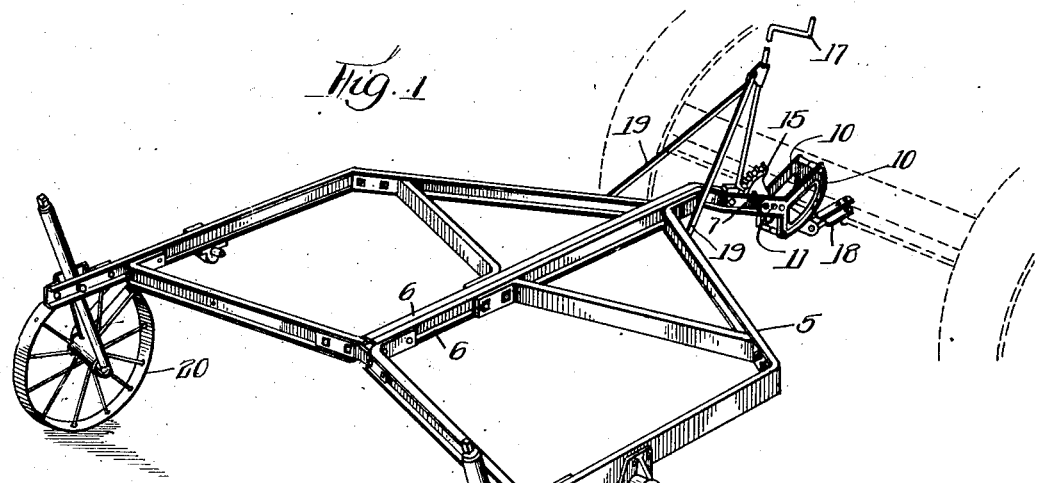
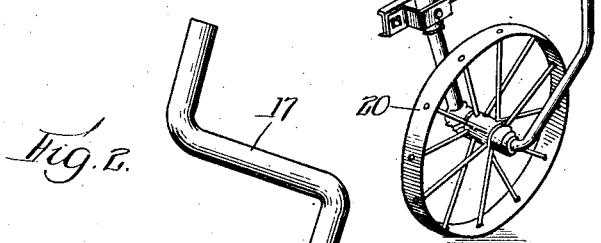
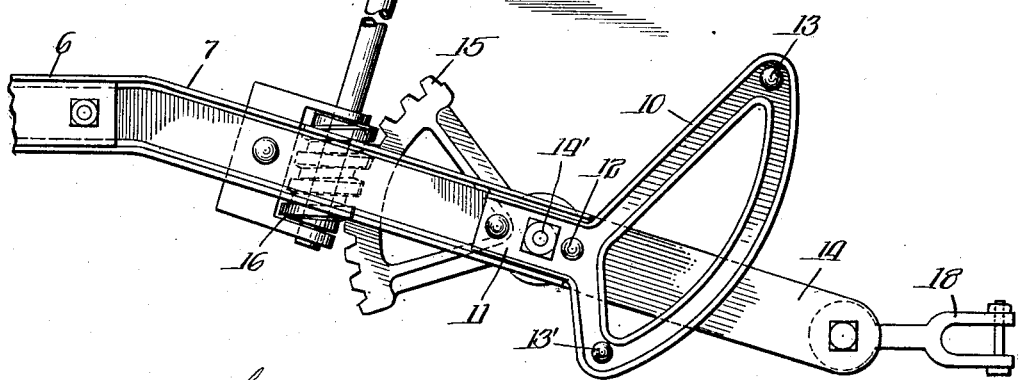
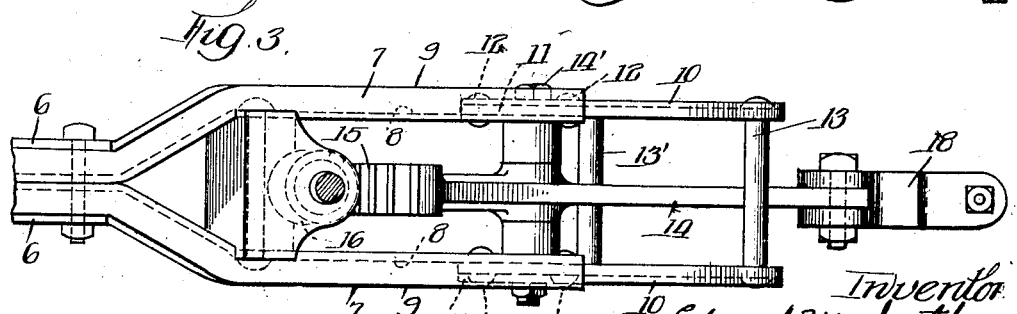
Inventor
Edward M. Smith
By Wm. O. Belt
  atty.

Patented July 7, 1931

1,812,904

UNITED STATES PATENT OFFICE

EDWARD M. SMITH, OF PEORIA, ILLINOIS, ASSIGNOR TO BROWN LYNCH SCOTT CO., OF MONMOUTH, ILLINOIS, A CORPORATION OF ILLINOIS

WHEELED HARROW FRAME ADJUSTMENT

Original application filed January 19, 1928, Serial No. 247,805. Patent No. 1,740,841, dated December 24, 1929. Divided and this application filed November 22, 1929. Serial No. 409,044.

This is a division of my application Serial No. 247,805, filed January 19, 1928.

The invention relates to improvements in wheeled harrows and its object is to provide simple means of novel construction which can be easily and quickly operated to vary the depth of cut of the disk gangs.

In the accompanying drawings illustrating a selected embodiment of the invention Fig. 1 is a perspective view of the wheeled harrow frame with the invention embodied therewith, the disk gangs being omitted;

Fig. 2 is a detail enlarged view of the front end adjusting means; and

Fig. 3 is a top plan view of the means shown in Fig. 2.

Referring to the drawings 5 designates generally the frame which comprises two center bars 6, 6 spread and bent downwardly at their front ends to form the spaced connecting bars 7, 7. These bars are made of channel iron with the webs 8, 8 on the inside and the flanges 9, 9 projecting outward therefrom. Parallel skeleton guides 10, 10 are carried by the bars 7, 7 and are provided with rearwardly projecting arms 11 which are seated in the channels against the web and between the flanges and are secured to the bars by bolts or rivets 12. The two guides are connected by rod 13 at the top and by rod 13′ at the bottom. A draft lever 14 is pivotally mounted at 14′ in a suitable manner between the bars 7, 7 and it is provided with a toothed segment 15. A worm gear 16 is supported between the bars and meshes with the segment gear and is operated by crank 17. The draft lever 14 projects forward between the two guides 10, 10 and also between the rods 13 and 13′, and it carries a clevis 18 or other suitable device at its front end for connecting the harrow to a tractor or other machine. Braces 19, 19 are connected to the crank rigidly in upright position. The elevation of the clevis is fixed substantially by its connection with the tractor and, therefore, manipulation of the crank 17 will result in causing the draft lever 14 to swing on its axis with the lever as a fulcrum to raise or lower the front end of the harrow for adjusting the depth of cut of the disks and also for lifting the disks above the ground for transporting the harrow. The guides support and reinforce the draft lever, especially in turning movements.

The invention provides means of simple construction which can be easily and accurately operated for adjusting the frame to regulate the depth of cut of the disks.

I have shown the invention in a selected embodiment but I reserve the right to make any changes that may be necessary or desirable to adapt the invention for different installations, or for other purposes, and within the scope of the following claims:

I claim:

1. The combination of a harrow frame, a forwardly extending lever pivotally mounted between its ends at the front of said frame, means at the front end of said lever for attaching the harrow to a tractor, and a gear and a segment for swinging said lever with the tractor connection as a fulcrum to raise and lower the frame.

2. The combination of a harrow frame, a forwardly extending lever pivotally mounted between its ends at the front of said frame, means at the front end of said lever for attaching the harrow to a tractor, a vertically operating segment at the rear of said lever, and means on the frame engaging said segment for swinging the lever with the tractor connection as a fulcrum to raise and lower the frame.

3. The combination of a harrow frame, a pair of spaced guides rigidly mounted thereon, a lever pivotally mounted between said guides, an attaching device at the front end of said lever, a toothed segment at the rear end of said lever, and means for operating said segment to swing said lever for raising and lowering the frame.

4. The combination of a harrow frame, a pair of spaced guides rigidly mounted thereon, a lever pivotally mounted between said guides and between its ends, means at the front end of said lever for attaching the harrow to a tractor, a toothed segment at the rear end of said lever, means on the harrow engaging said segment for swinging said lever with the tractor connection as a fulcrum to raise and lower the frame, and rods connecting the guides above and below the lever.

5. The combination of a harrow frame comprising two forwardly and downwardly projecting spaced channel bars, a pair of spaced guides, arms projecting rearward from the guides and seated in the channels of said frame bars, means securing the arms to the bars, a lever pivotally mounted in the frame between its ends and between the guides, means at the front end of said lever for attaching the harrow to a tractor and means at the rear end of said lever for swinging the lever with the tractor connection as a fulcrum to raise and lower the frame.

EDWARD M. SMITH.